US007495366B2

(12) United States Patent
Day et al.

(10) Patent No.: US 7,495,366 B2
(45) Date of Patent: Feb. 24, 2009

(54) COMPACT SLIP RING INCORPORATING FIBER-ON-TIPS CONTACT TECHNOLOGY

(75) Inventors: Michael J. Day, Blacksburg, VA (US); Norris E. Lewis, Christiansburg, VA (US); Jerry T. Perdue, Christiansburg, VA (US); Larry D. Vaught, Pembroke, VA (US); Hettie H. Webb, Radford, VA (US); Barry K. Witherspoon, Blacksburg, VA (US)

(73) Assignee: Moog Inc., East Aurora, NY (US)

( * ) Notice: Subject to any disclaimer, the term of this patent is extended or adjusted under 35 U.S.C. 154(b) by 226 days.

(21) Appl. No.: 11/518,977

(22) Filed: Sep. 11, 2006

(65) Prior Publication Data

US 2007/0120437 A1 May 31, 2007

Related U.S. Application Data

(63) Continuation-in-part of application No. 10/871,090, filed on Jun. 18, 2004, now Pat. No. 7,105,983.

(51) Int. Cl.
*H02K 41/00* (2006.01)

(52) U.S. Cl. ........................ 310/232; 310/233; 310/248

(58) Field of Classification Search ......... 310/231–233, 310/238, 248–251, 42
See application file for complete search history.

(56) References Cited

U.S. PATENT DOCUMENTS

| | | | | | |
|---|---|---|---|---|---|
| 2,269,614 | A | * | 1/1942 | Von Soden | 310/228 |
| 3,277,564 | A | * | 10/1966 | Webber et al. | 29/419.1 |
| 3,648,088 | A | * | 3/1972 | Wilkin et al. | 310/178 |
| 3,668,451 | A | * | 6/1972 | McNab | 310/248 |
| 3,821,024 | A | * | 6/1974 | Wilkin et al. | 428/634 |
| 4,019,076 | A | * | 4/1977 | Bates | 310/233 |
| 4,306,169 | A | * | 12/1981 | Diepers | 310/248 |
| 4,349,760 | A | * | 9/1982 | Diepers | 310/248 |
| 5,220,481 | A | * | 6/1993 | Swift et al. | 361/225 |
| 6,800,981 | B2 | * | 10/2004 | Kuhlmann-Wilsdorf | 310/239 |

* cited by examiner

*Primary Examiner*—Thanh Lam
(74) *Attorney, Agent, or Firm*—Phillips Lytle LLP

(57) ABSTRACT

A compact slip ring (20), which is particularly adapted for use in small spaces, is adapted to provide electrical contact between a rotor (22) and a stator (21). The improved slip ring broadly includes an electrically-conductive monofilament (24) having one end (28) mounted on the stator and having a distal end (34); a sleeve (25) mounted on and secured to the marginal end portion of the monofilament, adjacent the distal end; and a fiber bundle (26) having a longitudinal axis (39), one marginal end portion of the fiber bundle being recessed in and secured to the sleeve, the other end of the fiber bundle engaging the rotor such that the longitudinal axis of the fiber bundle will be substantially perpendicular to an imaginary line tangent to the rotor surface at the point of contact with the longitudinal axis.

14 Claims, 1 Drawing Sheet

COMPACT SLIP RING INCORPORATING FIBER-ON-TIPS CONTACT TECHNOLOGY

CROSS-REFERENCE TO RELATED APPLICATION

This application is a continuation-in-part of U.S. patent application Ser. No. 10/871,090, filed Jun. 18, 2004 now U.S. Pat. No. 7,105,983.

TECHNICAL FIELD

The present invention relates generally to slip rings for communicating electrical power and/or signal(s) between a rotor and a stator, and, more particularly, to a compact slip ring that incorporates fiber-on-tips electrical contact technology.

BACKGROUND ART

Electrical slip rings are used to transfer electrical power and/or signal(s) between a rotor and a stator. These devices are used in many different military and commercial applications, such as solar array drive mechanisms, aircraft and missile guidance platforms, undersea robots, CATSCAN systems, and the like. In some of these applications, slip rings are used in conjunction with other rotary components, such as torque motors, resolvers and encoders. Electrical slip rings must be designed to be located either on the platform axis of rotation, or be designed with an open bore which locates the electrical contacts off-axis. Hence, the designations "on-axis" and "off-axis" slip rings, respectively. The diameter of slip ring motors may range from a fraction of an inch to multiple feet, and the angular speed may vary from one revolution per day to as much as 20,000 revolutions per minute. In all of these applications, the electrical contacts between the rotor and stator must: (1) transfer power and/or signal(s) without interruption at high surface speeds, (2) have long wear life, (3) maintain low electrical noise, and (4) be of a physical size that allows multiple circuits to be packaged in a minimum volume.

The most efficient management of the electrical and mechanical contact physics allows the most demanding requirements to be met. For example, if the application is an off-axis slip ring that allows the x-ray tube in a CATSCAN gantry to rotate about the patient's body, the electrical contacts must be designed to carry about 100-200 amps (with surges of hundreds of amps), operate at surface speeds on the order of 500 inches per second, last for 100 million revolutions, and occupy a minimal volume within the gantry. In order to meet the 100 million revolution requirement for a device that is about six feet in diameter, the brush force must be low to minimize frictional heating and to maintain a large number of contact points between brush and ring to achieve the required current density.

Four types of electrical contacts between a rotor and stator include: (1) a composite solid material brush on a cantilevered spring, (2) a monofilament metal alloy brush that tangentially engages the rotor, (3) a fiber brush having a plurality of individual fibers, with the bundle tangentially engaging the rotor, and (4) a tip-of-fiber contact between the brush and rotor. The contact force, surface speeds and type of lubrication for each contact type is summarized in Table I. Table I also shows the types of lubricants required to reduce the contact frictional heating if the brush force is above one gram.

TABLE I

| Contact Type | Contact Force | Surface Speeds | Type of Lubrication |
|---|---|---|---|
| composite brush | 0.4 $kg/cm^2$ | 700 in/sec | sacrificial graphite film* |
| monofilament metal alloy | 3-20 grams | 12 in/sec | boundary lubrication** |
| tangential fiber brush | 1-3 grams | 200 in/sec | adventitious*** |
| fiber-on-tip | 0.1-1 grams | 1200 in/sec | adventitious*** |

*With a sacrificial graphite film, the brush and ring interface is lubricated by a film of graphite that is transferred from the brush to the ring. Material that is worn away is replaced by graphite from the brush.

**With boundary lubrication, a boundary lubricant film supports a portion of the load between the contact members. The points of metal contact support the remaining load between the contact members, and provide the current-carrying capability.

***With adventitious films, very thin films of materials that are capable of reducing the coefficient of friction between the contact members under light loads.

The tribological properties of electrical contacts and the right choice of lubricant to meet the requirements of the application are extremely important. For example, if the contacts are to be used in a space application, then the lubricant must meet all of the requirements of a ground based application, and have a low vapor pressure. If the contacts have a long life requirement, then dust, wear debris and other contaminants may accumulate in the contact zone and create problems with life and signal transfer. However, if the electrical contact members can be brought together with a force of about one gram or less, then the lubricant and the associated complications are eliminated.

For several years, fiber brushes with a tangential orientation to the ring have been successfully used to meet high surface speeds without the use of a lubricant.

When manufacturing slip rings in the range of four to six feet in diameter, the costs of the ring material, as well as the costs associated with the equipment used to cast the dielectric material that supports the rings, the costs of equipment required to machine the support structure, and the costs of the equipment used to electroplate precious metal on a ring, rise dramatically if a continuous ring approach is used. Large-diameter rings are normally machined from plate stock or tubing of the appropriate size. Another option is to form a metal strip of the required cross-section, to bend it into an annulus or ring, and to weld the facing ends together. In this case, the dimensional tolerances that must be held for the ring I.D. and O.D. cause the continuous ring to be prohibitively expensive. In addition, the bath required to electrodeposit metal on a six foot diameter ring is five to six times more expensive than that required for a 120° length of arc used to fabricate a segmented slip ring of the same diameter.

U.S. Pat. No. 5,054,189, the aggregate disclosure of which is hereby incorporated by reference, teaches a method of manufacturing an annular dielectric base portion of an electrical slip ring assembly having multiple electrical rings formed in the outer circumference. The rings are formed from conductive metal strips of the appropriate cross-sectional shape and configuration. When each ring is wrapped around the circumference of the base, the facing ends are intended to abut one another. However, because of dimensional variations in the base O.D. and dimensional variations in the length of the strip used to form the conductive ring, the facing ring ends sometimes do not abut properly. In practice, the length of the ring is controlled such that a gap always exists between the facing ring ends. This gap may vary from about 0.020 inches to about 0.040 inches. The brush technology used with this ring structure is the tangential fiber brush, which can readily move over that gap without mechanical and/or electrical interference. Over ten years of experience has shown that as the slip ring rotates, brush and ring wear debris and other particulate contaminants will accumulate in the gap. As the brushes continue to move over the gap, finely divided particles are dragged onto the ring surface, creating electrically-insulating films. Thus, problems develop with electrical signal transmission. Millions of ring revolutions may occur because these problems develop.

It would be generally desirable to provide an improved compact slip ring that would allow longer life, higher current densities, and higher rotor surface speeds to be achieved a lower costs that with current slip ring technology, and that uses fiber-on-tips electrical contact technology.

DISCLOSURE OF THE INVENTION

With parenthetical reference to the corresponding parts, portions or surfaces of the disclosed embodiment, merely for purposes of illustration and not by way of limitation, the present invention broadly provides and improved compact slip ring that is adapted to provide electrical contact between a stator and a rotor.

The improved slip ring (20) broadly includes: an electrically-conductive mono-filament (24) having one end (28) mounted on the stator (21) and having a distal end (34); a sleeve (25) mounted on and secured to the marginal end portion of the monofilament adjacent the distal end; and a fiber bundle (26) having a longitudinal axis (39), one marginal end portion of the fiber bundle being received in and secured to the sleeve, the other end of the fiber bundle engaging the rotor such that the longitudinal axis of the fiber bundle will be substantially perpendicular to an imaginary line tangent to the rotor surface at the point of contact with the longitudinal axis.

The monofilament may have a transverse cross-section that is substantially circular, and may have a diameter of about 0.015 inches. The monofilament may have a spring compliance (i.e., the reciprocal of the spring rate) of about 0.005 inches per gram of force. The monofilament may be formed of beryllium copper.

The sleeve is secured to the marginal end portion of the monofilament adjacent the distal end by swaging, crimping or welding. The fiber bundle one marginal end portion is secured to the sleeve by swaging or crimping. The monofilament distal end may abut one end of the fiber bundle.

There may be from about 25 to about 150 individual fibers in the bundle. The individual fibers may be formed of a corrosion- and wear-resistant hand material, such as a precious metal alloy or a suitable copper-based alloy.

The width of the slip ring (i.e., in a direction perpendicular to the plane of the paper) may be at least about 0.040 inches.

A collimator may surround a portion of the sleeve and may extend therebeyond. The lower end of the collimator tube is adapted to limit lateral movement of the lower marginal end portions of the fibers in the bundle when the rotor rotates relative to the stator. The collimator may be formed integrally with the sleeve.

The sleeve may be configured as an elbow. The interior surface of the sleeve is provided with a suitable non-oxidizing coating, such as gold or a gold alloy.

Accordingly, the general object of the invention is to provide a compact slip ring.

Another object is to provide a compact slip ring with fiber-on-tips electrical contact technology.

These and other objects and advantages will become apparent from the foregoing and ongoing written specification, the drawings and the appended claims.

DISCLOSURE OF THE PREFERRED EMBODIMENTS

Figure 1:
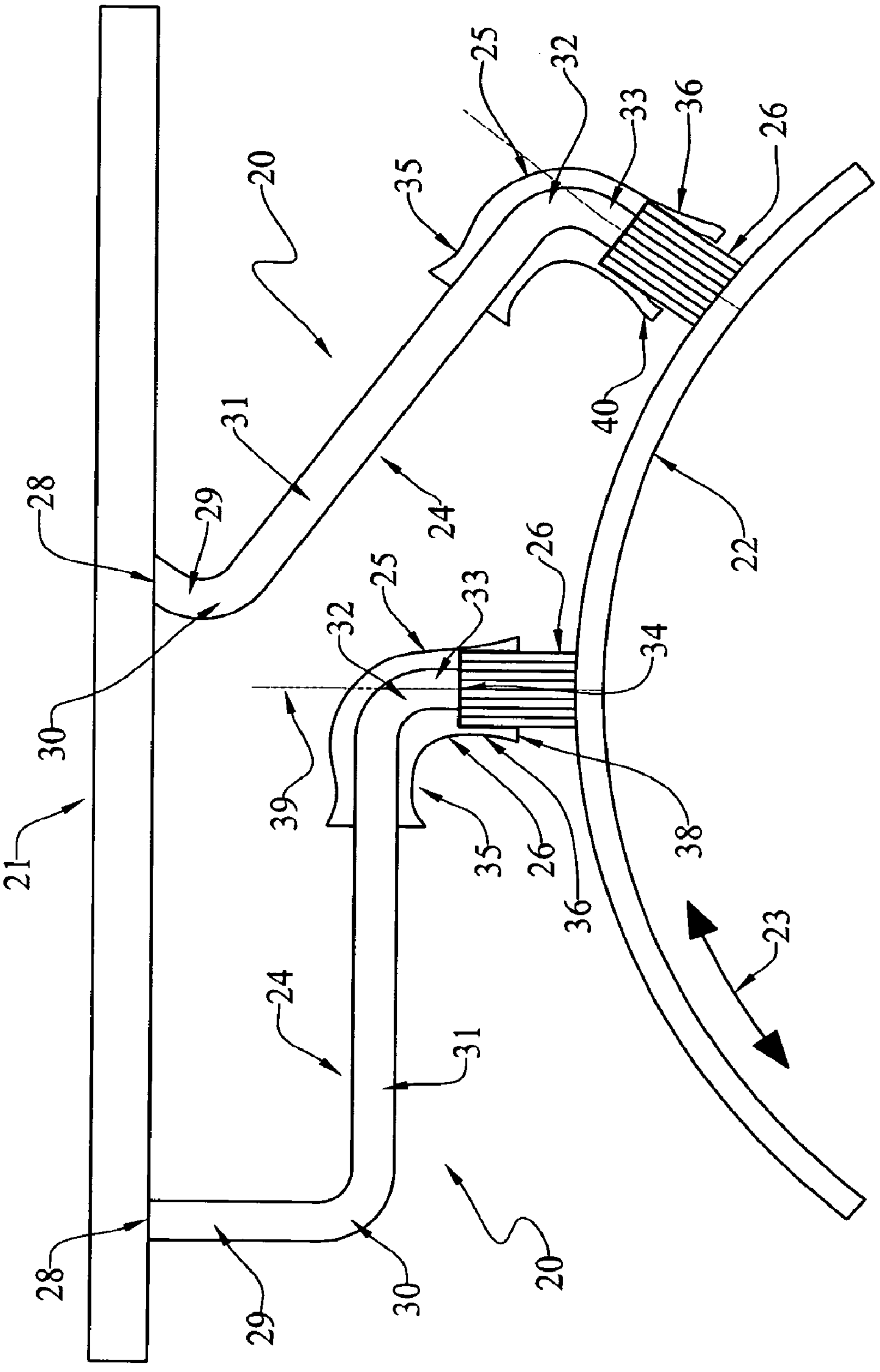
FIG. 1 is a schematic view of the improved compact slip ring, this view showing two individual slip rings as being mounted on the stator and engaging the rotor at two different relative angular positions.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion,. degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawing, and, particularly, to FIG. 1 thereof, the present invention broadly provides an improved compact slip ring that incorporates fiber-on-tips electrical contact technology.

In FIG. 1, two such slip rings, severally indicated at 20, are depicted as being operatively mounted between a stator, generally indicated at 21, and a rotor, generally indicated at Rotor 22 is adapted to be moved in either angular direction, as indicated by bi-directional arrow 23.

Each slip ring is arranged to provide electrical contact between portions of the rotor and the stator. Persons skilled in this art will readily appreciate that the slip rings do not just communicate the rotor with the stator. Rather, they communicated particular circuits on the rotor with cooperative circuits on the stator so as to establish electrical communication between these various circuits across the rotary interface between the rotor and stator. The two slip rings are identical, except as discussed herein, and are illustrated as being in different angular positions relative to the rotor. Because of this, only one of the slip rings will be explicitly described, it being understood that the corresponding reference numeral will refer to the corresponding part, portion or surface of the other slip ring.

As noted at the outset, the invention provides a compact slip ring, it is adapted for use where the physical spacing between the rotor and stator is relatively small. In prior application Ser. No. 10/871,090, the disclosed forms of the slip ring were particularly adapted for use with large-diameter rotors, such as used in CATSCAN machines, and the like. The foregoing statement is not intended to be limitative of the scope of the claims in the earlier application. However, by way of contrast, the present invention is particularly suited for use where the spacing between the rotor and stator is more limited. Hence, the present invention is regarded as being a compact slip ring. Here again, while this is preferred, this statement should not be regarded as being limitative of the scope of the appended claims.

Adverting now to FIG. 1, the improved slip ring is shown as broadly including an electrically-conductive monofilament fiber, generally indicated at 24; a sleeve 25; and a fiber bundle, generally indicated at 26.

The monofilament 24 is formed of a suitable electrically-conductive material, such as beryllium copper. In the preferred embodiment, the monofilament has a substantially circular transverse cross-section of a diameter of about 0.015 inches. However, while is illustrative of the preferred embodiment, it should be clearly understood that the monofilament may have other transverse cross-sectional shapes as well. For example, the monofilament may have a square, rectangular, polygonal, oval, or some other transverse cross-sectional shape or configuration.

In the illustrated form, the monofilament is an integrally-formed element bent to have a somewhat S-shape or appearance. More particularly, the monofilament has one marginal end 28 secured to the stator so as to be electrically conductive therewith, has one marginal end portion 29 extending downwardly therefrom, has a bend 30, has an intermediate portion 31, has a second bend 32, and has a distal marginal end portion 33 terminating in a circular end face 34. Ideally, the monofilament may be formed suitably bending the monofilament to the shape shown. In the embodiment shown to the left in FIG. 1, the arcuate portions 30 and 32 nominally inscribe angles of about 90°. In the embodiment to the right in FIG. 1, the monofilament is shown as having moved toward the rotor so as to maintain contact therewith. In other words, whereas angled portion 32 in the right embodiment is still about 90°, angled portion 30 now encompasses an obtuse angle of greater than 90°.

The slip ring may be formed of a suitable material such as beryllium copper, and typically has a spring compliance on the order of about 0.005 inches per gram of force. As used herein, spring compliance is the reciprocal of the spring rate. Persons skilled in this art will readily appreciate that the equation for the force of a spring is $F=kx$, where F is the Force, k is the spring rate and x is the displacement. As used herein, the term "spring compliance" is $1/k$.

Adverting now to the drawing figure, the sleeve 25 is mounted on and secured to the marginal end portion of the monofilament adjacent its distal end 34. More particularly, in the form shown, the sleeve is configured somewhat as an elbow. The sleeve is formed of a suitable conductive material, and one or more surfaces thereof may be plated with a non-oxidizing material, such as gold. The upper marginal end portion of the sleeve is suitably secured, as by swaging, crimping or welding, to the distal marginal end portion of the mono-filament. In the drawing figures, the upper marginal end portion of the tube is shown as having an annular indentation, indicated at 35, that results from a swaging or crimping operation. Alternatively, the sleeve could be suitably welded, such as electronically or ultrasonically, to the sleeve.

The other end of the sleeve is shown as receiving a bundle 26 of individual fibers. The upper end face of these fibers are shown as abutting the distal end face 34 of the monofilaments so as to be in the electrical contact therewith. As indicated, the upper marginal end portion of the fiber bundle is received in the lower open end of the sleeve. The sleeve may be suitably deformed, as be crimping or swaging, to hold the fiber bundle in this position. In the drawing figure, the sleeve is shown as having an annular indentation 36 which results from this crimping or swaging operation. The lower operation end portion of the fibers extends downwardly beyond the lower end face 38 of the sleeve, and is in continuous touching contact with the outer surface of the rotor. More particularly, the nominal center line 39 of the fiber bundle is maintained so as to be substantially perpendicular to an imaginary line (not shown) tangent to the point of contact. Thus, with the improved actuator, the tips of the individual fibers are held in touching contact with the outer surface of the rotor. The fiber bundle may have from about 25 to about 150 individual fibers.

The illustrated embodiments do differ in that the embodiment to the right is shown as having an integrally-formed collimator portion 40 that extends downwardly below the nominal end face of the leftward sleeve. The purpose of this collimator is to limit lateral movement of the lower marginal end portions of the fibers in the bundle when the rotor rotates relative to the stator. In the preferred form, this collimator is formed integrally with the sleeve. However, this is not invariable.

Therefore, the present invention broadly provides an improved slip ring, which is particularly adapted for use in compact spaces, that is adapted to provide electrical contact between a rotor and a stator. The improved slip ring broadly includes an electrically-conductive monofilament having one end mounted on the stator and having a distal end; a sleeve mounted on and secured to the marginal end portion of the monofilament, adjacent the distal end; and a fiber bundle having a longitudinal axis, one marginal end portion of the fiber bundle being recessed in and secured to the sleeve, the other end of the fiber bundle engaging the rotor such that the longitudinal axis of the fiber bundle will be substantially perpendicular to an imaginary line tangent to the rotor surface at the point of contact with the longitudinal axis.

Modifications

The present invention contemplates that many changes and modifications may be made. For example, the relative size and diameter of the rotor is not deemed to be particularly critical, although the invention is particularly suited for use in a compact space.

The manner of attachment or securement of the monofilament to the stator is not deemed critical, and may be varied while the monofilament should be formed of an electrically-conductive material. While beryllium copper is one such material, other types of electrically-conductive materials might be substituted therefore. As previously indicated, the transverse cross-section of the monofilament. Similarly, the monofilament may be bent or otherwise configured to have shaped other than that specifically illustrated in the drawing.

The sleeve may be bent to the form of an elbow or may have some other shape as well. The upper marginal end portion of the fiber bundle is preferably received in the open mouth of the sleeve, and is suitably secured therein, as by crimping or swaging. Similarly, it is presently preferred that the sleeve be crimped, swaged or welded to the monofilament.

The rotor may be in the form of a cylinder (as shown), or may be of the pancake type. See, e.g., U.S. Pat. Nos. 5,901,429 and 6,222,297 for examples of pancake-type rotors.

Therefore, while the presently-preferred forms of the improved slip ring have been shown and described, and several modifications thereof discussed, persons skilled in this art will readily appreciate that various additional changes and modifications may be made without departing from the spirit of the invention, as defined and differentiated by the following claims.

What is claimed is:

1. A slip ring adapted to provide electrical contact between a stator and a rotor, comprising:

an electrically-conductive monofilament having one end mounted on said stator and having a distal end;

a sleeve mounted on and secured to the marginal end portion of said monofilament adjacent said distal end; and a fiber bundle having a longitudinal axis, one marginal end portion of said fiber bundle being received in and secured to said sleeve, the other end of said fiber bundle engaging said rotor such that the longitudinal axis of said fiber bundle will be substantially perpendicular to an imaginary line tangent to said rotor surface at the point of contact with said longitudinal axis.

2. A slip ring as set forth in claim 1 wherein said monofilament has a transverse cross-section that is substantially circular.

3. A slip ring as set forth in claim 2 wherein said monofilament has a diameter of about 0.015 inches.

4. A slip ring as set forth in claim 3 wherein said monofilament has a spring compliance of about 0.005 inches per gram of force.

5. A slip ring as set forth in claim 3 wherein said monofilament is formed of beryllium copper.

6. A slip ring as set forth in claim 1 wherein said sleeve is secured to the marginal end portion of said monofilament adjacent said distal end by swaging, crimping or welding.

7. A slip ring as set forth in claim 1 wherein said fiber bundle one marginal end portion is secured to said sleeve by swaging or crimping.

8. A slip ring as set forth in claim 1 wherein said monofilament distal end abuts one end of said fiber bundle.

9. A slip ring as set forth in claim 1 wherein there are from about 25 to about 150 individual fibers in said bundle.

10. A slip ring as set forth in claim 1 wherein the width of said slip ring is at least about 0.040 inches.

11. A slip ring as set forth in claim 1 and further comprising a collimator surrounding a portion of said sleeve and extending therebeyond, the lower end of said collimator tube being adapted to limit lateral movement of the lower marginal end portions of the fibers in said bundle when said rotor rotates relative to said stator.

12. A slip ring as set forth in claim 11 wherein said collimator is formed integrally with said sleeve.

13. A slip ring as set forth in claim 1 wherein said sleeve is configured as an elbow.

14. A slip ring as set forth in claim 1 wherein the interior surface of said sleeve is provided with an non-oxidizing coating.

* * * * *

UNITED STATES PATENT AND TRADEMARK OFFICE

CERTIFICATE OF CORRECTION

PATENT NO. : 7,495,366 B2
APPLICATION NO. : 11/518977
DATED : February 24, 2009
INVENTOR(S) : Norris E Lewis and Barry K. Witherspoon It is certified that error appears in the above-identified patent and that said Letters Patent is hereby corrected as shown below:

On the title page item (75),
The error is the list of inventors. They are listed as Michael J. Day, Norris E. Lewis, Jerry T. Perdue, Larry D. Vaught, Hettie H. Webb and Barry K. Witherspoon.

The inventors should be: Norris E Lewis and Barry K. Witherspoon as indicated to the Office by our letter dated October 9, 2008 with attachments. The Office indicated on January 14, 2009 that the inventors of Michael J. Day, Jerry T. Perdue, Larry D. Vaught and Hette H. Webb would be deleted.

Signed and Sealed this

Second Day of June, 2009

John Doll

JOHN DOLL
*Acting Director of the United States Patent and Trademark Office*